May 29, 1951 J. A. SCHWARZ 2,554,506
RADIAL CONTACT SWITCH
Filed May 21, 1947 2 Sheets-Sheet 1
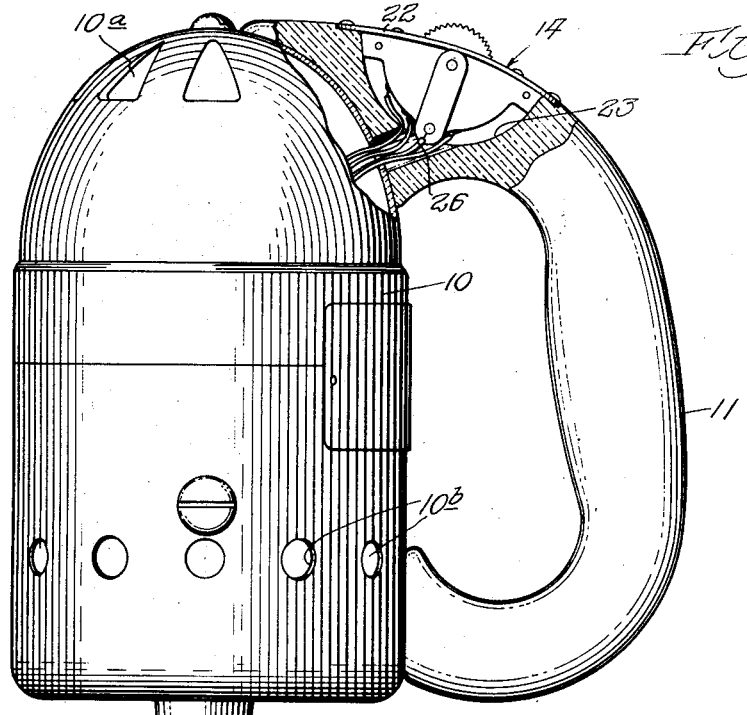
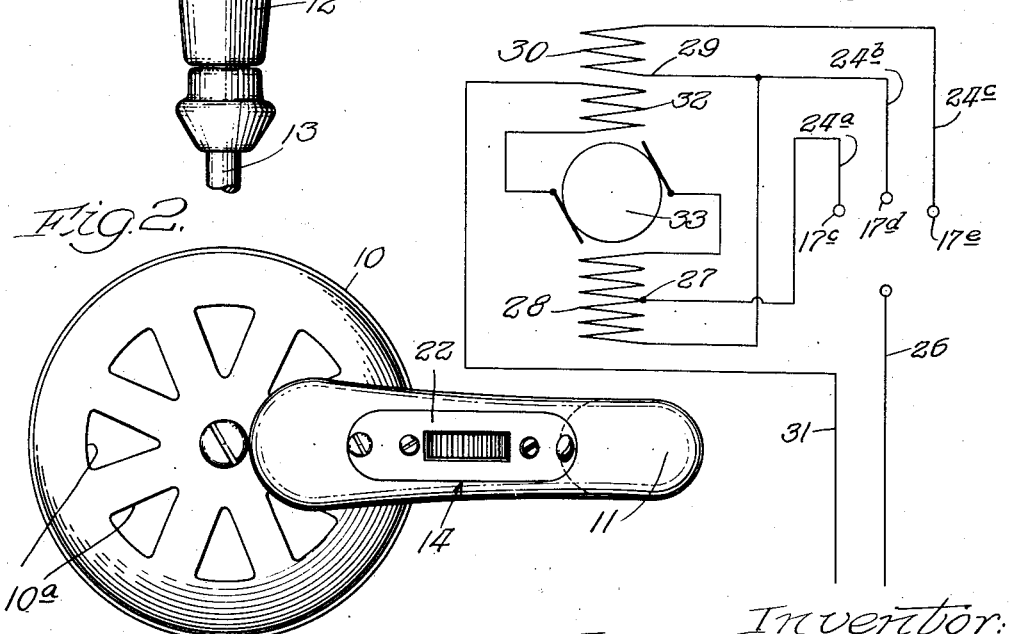
Inventor:
Joseph A. Schwarz,
By Christon, Schroeder, Merriam & Ogden,
Attys.

May 29, 1951  J. A. SCHWARZ  2,554,506
RADIAL CONTACT SWITCH
Filed May 21, 1947  2 Sheets-Sheet 2
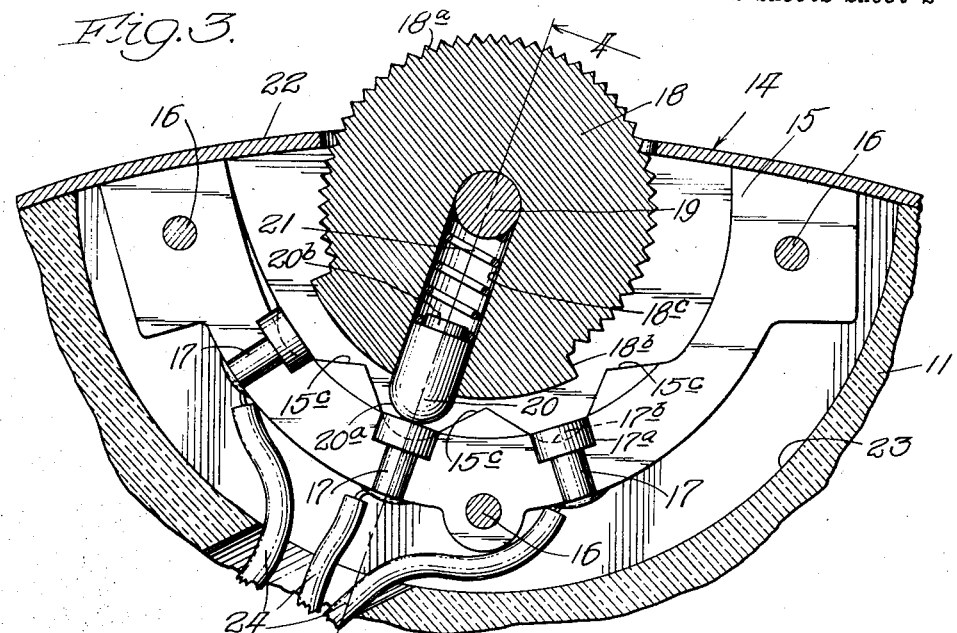
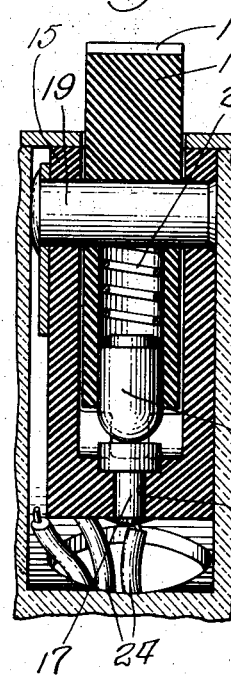
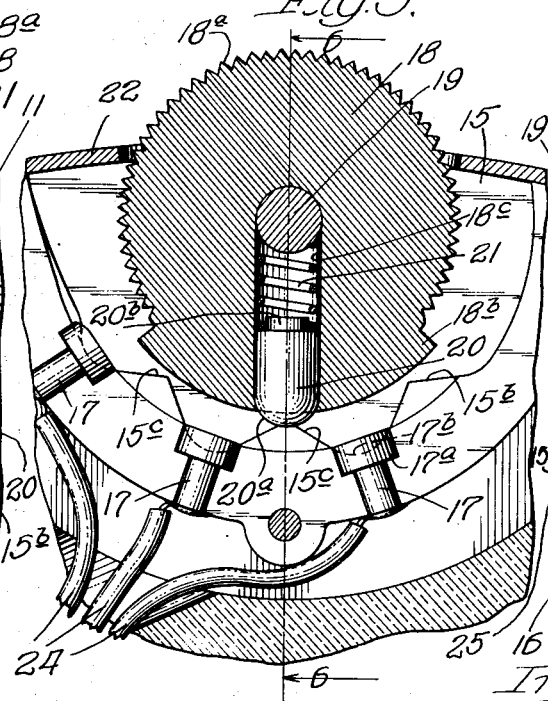
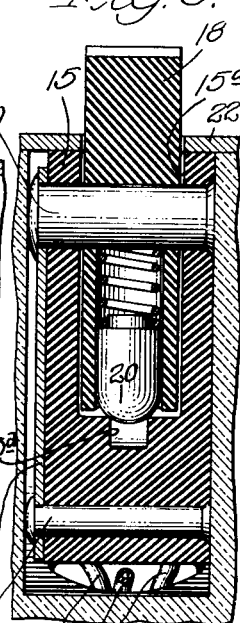
Inventor:
Joseph A. Schwarz,
By Chritty, Schroeder, Merriam & Hofgren,
Attys.

Patented May 29, 1951

2,554,506

UNITED STATES PATENT OFFICE 2,554,506

RADIAL CONTACT SWITCH

Joseph A. Schwarz, Chicago, Ill., assignor to Birtman Electric Company, a corporation of Illinois Application May 21, 1947, Serial No. 749,553

6 Claims. (Cl. 200—8)

This invention relates to a motor control for an electric motor.

The invention, which is the subject of this application, is drawn to that type of motor control wherein the speed of the motor is regulated by having tapped leads or electrical conduits leading to the field coils of the motor and a contact member movable from one contact to the other. This type of control is simple and inexpensive, but has not always been satisfactory in the past due to the inefficiency of the control means used to energize the various field circuits. Also, many of these controls in the past have been too large and bulky to be used on small motors. The control means of this invention overcomes these difficulties as it is quite small yet is efficient in operation. It may be used on small motors such as those employed in food mixers and is inexpensive to build and efficient in operation.

The invention will be described as related to one embodiment of the same as shown in the accompanying drawings. Of the drawings: Fig. 1 is an elevation of a portable motor adapted for use on food mixers and the like with portions in section for clarity of illustration; Fig. 2 is a plan view of the motor of Fig. 1; Fig. 3 is an enlarged sectional view of the motor control used on the motor shown in Figs. 1 and 2; Fig. 4 is a section taken along line 4—4 of Fig. 3; Fig. 5 is a view similar to Fig. 3 but showing the movable portion of the motor control in an intermediate position between the contacts; Fig. 6 is a section taken along line 6—6 of Fig. 5; and Fig. 7 is a diagrammatic view showing one embodiment of the electrical circuit to the motor.

Although the motor control will be described herein as applied to a food mixer motor, it is believed obvious that it can be used for other types of motors.

The motor shown in the accompanying drawings comprises a casing 10 having top 10a and bottom 10b air ports for the circulation of cooling air, a handle 11, a housing 12 for the drive shaft, a beater shaft 13 attached to the drive shaft, and a motor control 14 mounted on the top portion of the handle 11.

The motor control 14 comprises a housing 15 divided into two symmetrical parts and provided with a central cavity 15a therein. These two parts are held together by three spaced rivets 16 located around the periphery of the housing. The bottom portion of the housing 15 is provided with three spaced openings 15b extending into the central cavity 15a and in which are located contact members 17. These openings 15b are formed of cooperating grooves in each part of the housing 15 so that when the parts are arranged together, the openings will be defined. Each contact member 17 has an enlarged head portion 17a provided with a depressed portion 17b in its inner end adjacent the cavity 15a. This cavity has an approximately semicircular bottom wall.

Rotatably mounted within the cavity 15a there is located an approximately circular rotatable member 18 that is rotatably mounted on a rivet 19 held in the housing. This rotatable member has a major portion of its outer edge provided with serrations 18a with the unserrated portion 18b extending beyond the serrations and arranged adjacent the contact members 17. Located within the rotatable member 18 is a cylindrical opening 18c extending from the surface of the unserrated portion 18b to the mounting rivet 19. Located within the opening 18c is a detent 20 having a rounded head 20a adapted to engage alternately the depressed portion 17b of the contact members 17. This detent 20 is urged outwardly by a compression spring 21 extending between the detent and the mounting rivet 19. This spring serves to hold the detent in engagement with a contact member 17. The detent 20 is provided with an inwardly extending circular portion 20b located substantially concentric to the spring 21 so as to aid in properly locating the spring.

The housing 15 is adapted to be fastened to a curved plate 22 having an opening therein through which the rotatable member 18 extends. This curved plate may be fastened to the outside surface of the top part of the handle 11, as shown in Figs. 1 and 2, with the housing extending into a hole 23 in this top portion of the handle. This provides a smooth surface with the rotatable member 18 extending beyond the surface and in a position to be operated by the thumb of a hand grasping the handle 11, as shown in Fig. 1.

Each of the contact members 17 is electrically connected to the field coil of the motor by means of an insulated wire 24. The electrical circuit through the control members is provided by arranging a plate 25 on the side of the housing 15 with this plate extending between the lowest housing rivet 16 and the mounting rivet 19 for the rotatable member 18. A wire 26 is attached to the plate 25 as by soldering. This wire is intended to be connected to a source of electric current when the motor is being operated. With this arrangement, the electrical circuit is completed through the plate 25, the mounting rivet 19, the spring 21, a contact member 17, and a wire 24 to the field of the motor.

The surface of the central cavity 15a in the housing 15 opposite the edge of the rotatable member 18 is provided with three spaced raised portions 15c with one raised portion being between the first and second contact member, a second raised portion between the second and third contact member, and a third raised portion beyond the third contact member. These raised portions are provided with longitudinal grooves 15d so that when the rotatable member 18 is turned the detent 20 will ride on the edges of these grooves as shown in Fig. 6. This reduces the frictional drag on the detent. The last raised portion 15c aids in positioning the detent in an "off" position. When the detent is moved over this last raised portion, it is held so that it will not be accidentally moved to a contact member. This arrangement is shown in Fig. 5. As was explained above, the housing 15 is divided into two similar cooperating portions. The plane that divides the housing passes through the rotatable member 18, the spring 21, the detent 20, the raised portions 15c, the grooves 15d, and the contact members 17. This arrangement aids in assembling the motor control.

The wiring diagram for a typical motor using the motor control of this invention is shown diagrammatically in Fig. 7. As is here shown, one wire 26 from the source of electricity is led to the motor control. A low speed contact 17c is led through a wire 24a to a tap 27 on a field coil 28. Another contact member 17d is led through a wire 24b to one side of the field coil 28 and to a tap 29 on another field coil 30. The third contact member 17e is led through a wire 24c to one side of a field coil 30. Another wire 31 that is adapted to be connected to a source of electricity is attached to a third field coil 32 and the field coil 28 at the end which is opposite the wire 24b connected to the armature 33. The other side of the armature is connected to the field coil 32 on the end opposite the wire 31. In a typical installation, field coil 28 will consist of 425 turns of No. 27 wire with the tap 27 being located at 175 turns from the end of the coil opposite the armature, field coil 30 may consist of 250 turns of No. 27 wire, while coil 32 may consist of 150 turns of No. 26 wire. This will provide an approximately $\frac{1}{10}$ horsepower motor operating at 400 R. P. M. on contact member 17c, approximately 650 R. P. M. on contact member 17d, and approximately 1200 R. P. M. on contact member 17e. The "off" position, as shown in Fig. 5, may be located opposite either contact member 17c or 17e. It is preferred, however, that it be located opposite the low speed contact 17c. As can be seen in Fig. 7, when the motor control is moved from a low to a high speed position more of the field coils will be energized. It is, of course, obvious that other arrangements may be used on different types of motors with the control means of this invention being used on almost any type of motor.

Having described my invention as related to the embodiment shown in the accompanying drawings, it is my intention that the invention be not limited by any of the details of description unless otherwise specified but rather be construed broadly within its spirit and scope as set out in the accompanying claims.

I claim:

1. An electrical control apparatus comprising a rotatable member, a plurality of spaced electrical contacts arranged adjacent the rotatable member, a contact member mounted on the rotatable member and adapted to engage said contacts successively as the rotatable member is turned, and a groove between each pair of adjacent contacts with the contact member adapted to engage only the edges of said groove to reduce the frictional drag on said contact member when said member is moved from one contact to another.

2. An electrical control apparatus comprising a rotatable member, a housing around at least a portion of said member, an electrically conducting axle in said housing upon which said rotatable member is mounted, a plurality of electrical contacts in said housing arranged adjacent the edge of said rotatable member, an electrical contact member held by said rotatable member at the edge thereof to engage the contacts alternately, and spring means bearing against said axle and said contact member to urge the contact member outwardly in engagement with said contacts, said axle, spring means and contact member forming an electrical circuit.

3. The apparatus of claim 2 wherein said axle extends to the outer surface of said housing, and there is provided an electrically conducting plate member fixedly mounted on the outer surface of said housing with said axle engaging said plate member, said electrical circuit including said plate member.

4. An electrical control apparatus comprising a rotatable member, a housing around at least a portion of said member, a plurality of spaced electrical contacts in said housing arranged adjacent the edge of said rotatable member, a raised portion between each adjacent pair of contacts with each raised portion having a groove in the surface thereof adjacent the rotatable member, each groove having substantially parallel edges, an electrical contact member held by said rotatable member at the edge thereof to engage said contacts alternately and having a rounded outer end, said rounded outer end of the contact member having a width greater than that of said groove so that the member bears against only said outer edges of the groove in a raised portion to reduce the frictional drag on said contact member when moving from one contact member to the next.

5. An electrical control apparatus comprising a rotatable member, an electrical conducting axle on which said rotatable member is mounted, a housing therearound from which the edge portion of the rotatable member extends to provide a hand-engageable portion, a plurality of electrical contacts in said housing arranged adjacent the inner edge of said rotatable member, a raised portion between each adjacent pair of contacts and extending toward the edge of said rotatable member, an electrical contact member held by said rotatable member and rotatable therewith to engage the contacts alternately, said contact member passing over said raised portions when being moved along the contacts, and spring means urging the contact member outwardly, said spring means being electrically attached to said axle and to said contact member and the electrical circuit in the control apparatus including said axle and spring means.

6. An electrical control apparatus comprising a rotatable member, a housing therearound from which the edge portion of the rotatable member extends to provide a hand-engageable portion, a plurality of electrical contacts in said housing arranged adjacent the inner edge of said rotatable member, a raised portion between each adjacent pair of contacts and extending toward the edge of said rotatable member, an electrical contact member held by said rotatable member and rotatable therewith to engage the contacts alternately, said contact member passing over said raised portions when being moved along the contacts, and spring means urging the contact member outwardly, said raised portion being provided with a longitudinal groove with the contact member engaging the edges of said groove during the travel of the contact member.

JOSEPH A. SCHWARZ.

REFERENCES CITED

The following references are of record in the file of this patent:

UNITED STATES PATENTS

| Number | Name | Date |
|---|---|---|
| 309,536 | Freeman | Dec. 23, 1884 |
| 691,188 | Schramm | Jan. 14, 1902 |
| 789,377 | Newman | May 9, 1905 |
| 987,979 | Gray | Mar. 28, 1911 |
| 1,605,681 | Meuer | Nov. 2, 1926 |
| 1,846,430 | Meuer | Feb. 23, 1932 |
| 1,873,527 | Anfinnsen et al. | Aug. 23, 1932 |
| 1,956,378 | Douglas | Apr. 24, 1934 |
| 2,095,175 | Douglas | Oct. 5, 1937 |
| 2,163,626 | Peterson | June 27, 1939 |
| 2,201,881 | Bryant et al. | May 21, 1940 |
| 2,406,818 | Erb | Sept. 3, 1946 |
| 2,498,805 | Gurevsky | Feb. 28, 1950 |

FOREIGN PATENTS

| Number | Country | Date |
|---|---|---|
| 443,867 | Germany | May 6, 1947 |